United States Patent
Zhang et al.

(10) Patent No.: US 10,630,403 B2
(45) Date of Patent: Apr. 21, 2020

(54) METHOD FOR DETERMINING A DOPPLER FREQUENCY SHIFT OF A WIRELESS SIGNAL DIRECTLY REFLECTED BY A MOVING OBJECT

(71) Applicant: Peking University, Beijing (CN)

(72) Inventors: Daqing Zhang, Beijing (CN); Xiang Li, Beijing (CN)

(73) Assignee: Peking University, Beijing (CN)

( * ) Notice: Subject to any disclaimer, the term of this patent is extended or adjusted under 35 U.S.C. 154(b) by 27 days.

(21) Appl. No.: 16/034,853

(22) Filed: Jul. 13, 2018

(65) Prior Publication Data

US 2019/0020425 A1    Jan. 17, 2019

(30) Foreign Application Priority Data

Jul. 17, 2017 (CN) .......................... 2017 1 0579684

(51) Int. Cl.
  *H04B 17/309*   (2015.01)
  *H04W 56/00*    (2009.01)
  *H04B 7/01*     (2006.01)
  *H04W 4/02*     (2018.01)

(52) U.S. Cl.
  CPC ............. *H04B 17/309* (2015.01); *H04B 7/01* (2013.01); *H04W 4/027* (2013.01); *H04W 56/0035* (2013.01)

(58) Field of Classification Search
  CPC ....... H04B 17/309; H04B 7/01; H04W 4/027; H04W 56/0035
  See application file for complete search history.

(56) References Cited

U.S. PATENT DOCUMENTS

| | | | | |
|---|---|---|---|---|
| 9,680,607 | B2 * | 6/2017 | Nammi | H04L 1/0028 |
| 9,813,133 | B2 * | 11/2017 | Ko | H04B 7/0456 |
| 9,900,068 | B2 * | 2/2018 | Park | H04B 7/0469 |
| 9,900,076 | B2 * | 2/2018 | Liu | H04B 7/0602 |

(Continued)

OTHER PUBLICATIONS

Schmidt, R., "Multiple Emitter Location and Signal Parameter Estimation," IEEE Transactions on Antennas and Propagation, vol. AP-34, No. 3, Mar. 1986, 5 pages.

(Continued)

*Primary Examiner* — Sonny Trinh
(74) *Attorney, Agent, or Firm* — McCoy Russell LLP (57) ABSTRACT

The present disclosure provides a method for determining a Doppler frequency shift of a wireless signal directly reflected by a moving object. An example method includes eliminating a random phase shift caused by non-synchronization between a wireless transmitting device and a wireless receiving device by using conjugate multiplication of the channel state information (CSI) on two antennas, thereby obtaining the complete Doppler frequency shift information from the phase information of the channel state information. The example method eliminates the effect on the Doppler frequency shift caused by frequency information of static paths in a manner of removing the mean, thereby obtaining an accurate frequency estimation of the moving object. A Multiple Signal Classification (MUSIC) algorithm may be used to estimate a frequency spectrum according to practical sampling intervals to avoid an effect on the frequency estimation accuracy caused by uneven sampling rate in a practical wireless transceiving system.

20 Claims, 7 Drawing Sheets a b (56) References Cited

U.S. PATENT DOCUMENTS

2016/0036511 A1* 2/2016 Ko .................. H04B 7/0456
                                                        370/252
2018/0041264 A1* 2/2018 Ko .................. H04B 7/0469
2019/0104549 A1* 4/2019 Deng ................ H04B 7/0617

OTHER PUBLICATIONS

Pu, Q. et al., "Whole-Home Gesture Recognition Using Wireless Signals," Proceedings of the 19th annual International Conference on Mobile Computing & Networking, Sep. 30, 2013, Miami, Florida, 12 pages.

Wang, W. et al., "Understanding and Modeling of WiFi Signal Based Human Activity Recognition," Proceedings of the 21st Annual International Conference on Mobile Computing and Networking, Sep. 7, 2015, Paris, France, 12 pages.

Qian, K et al., "Decimeter Level Passive Tracking with WiFi," Proceedings of the 3rd Workshop on Hot Topics in Wireless, Oct. 3, 2016, New York City, New York, 5 pages.

* cited by examiner

METHOD FOR DETERMINING A DOPPLER FREQUENCY SHIFT OF A WIRELESS SIGNAL DIRECTLY REFLECTED BY A MOVING OBJECT

CROSS REFERENCE TO RELATED APPLICATION

This application claims priority to Chinese Application No. 201710579684.9 entitled "A METHOD FOR DETERMINING A DOPPLER FREQUENCY SHIFT OF A WIRELESS SIGNAL DIRECTLY REFLECTED BY A MOVING OBJECT," filed on Jul. 17, 2017, the entire contents of which is hereby incorporated by reference in its entirety for all purposes.

TECHNICAL FIELD

The present disclosure relates to a technical field of wireless signals, and more particularly to a method for determining a Doppler frequency shift of a wireless signal directly reflected by a moving object.

BACKGROUND ART

During transmission, the wireless signal not only arrives at a receiving terminal through a direct path between a transmitting and a receiving device, but meanwhile arrives at the receiving terminal through the reflection of objects (ground, people, wall, furniture, etc.) in a transmission environment as well. This is also known as multi-path propagation. If one of the transmitting terminal, the reflector, or the receiving terminal in a signal path is in constant motion, this would lead to an offset between the frequency of the signal measured at the receiving terminal and the carrier frequency of the signal transmitted at the transmitting terminal. Such frequency shift is called a Doppler frequency shift. When there is a moving object in the transmission environment, a wireless signal reflected by this object will also be received at the receiving terminal. If the Doppler frequency shift of the signal reflected by the moving object can be recognized, a speed characteristics of the moving object can be obtained therefrom, so as to analyze the state of the moving object (for example, the speed variation, walk, run, falling down, etc.) or track the moving object, and so on.

However, nowadays, the carrier signal frequency commonly used in the commercial radio frequency communication systems (Wi-Fi, RFID, cellular networks, etc.) are between hundreds of megabytes Hertz and dozens of gigabytes Hertz. In such a high carrier frequency wireless system, the Doppler frequency shift introduced by the moving objects is merely a few dozens of Hertz. A highly accurate sampling of the frequency domain is required in case of intending to extract such "tiny" Doppler frequency shift from such high carrier frequency signal.

In 1986, an American Ralph O. Schmidt proposed a Multiple Signal Classification (MUSIC) algorithm in a literature 1 (Multiple emitter location and signal parameter estimation, IEEE transactions on antennas and propagation, AP-34(3):276-280, March 1986, the entire contents of which is hereby incorporated by reference in its entirety for all purposes), which could distinguish multiple incident signals superposed at an antenna array of the receiving terminal by means of decomposing eigenvalues of an autocorrelation matrix, and estimates the respective arrival angles thereof. The MUSIC algorithm is a spatial spectral estimation algorithm that separates the signal subspace and the noise subspace with a covariance matrix of the received data, generates a space scan spectrum with the orthogonality among the signal steering vectors and the noise subspace, searches a spectral peak over the entire domain, so as to obtain the angle estimation of the signal. The MUSIC algorithm could achieve a high resolution of the direction-finding; asymptotical unbiased estimation on the number of signal, DOA (direction of arrival), polarization, the intensity of noise interference, the intensity of an incoming wave, and coherence relationship; the capability of resolving DOA estimation problem for a multi-path signal; the capability of wireless direction-finding in a dense signal environment. Besides arrival angular information, the MUSIC algorithm also can be applied to wireless signal frequency estimation.

In 2013, an American Qifan PU proposed a solution in a literature 2 (Whole-home gesture recognition using wireless signals, MobiCom13, the entire contents of which is hereby incorporated by reference in its entirety for all purposes): during the digital signal processing phase of a Wi-Fi signal, it obtains sufficiently long samplings of a time-domain signal by splicing multiple Wi-Fi signal symbols, afterwards obtaining a high-precision frequency-domain sampling by a Fast Fourier Transform. However, this method requires that a conventional Wi-Fi signal receiver is modified, such that multiple Wi-Fi signal symbols at the receiving terminal can be spliced. For a common commercial wireless transceiver, such as a Wi-Fi network card, a router, a RFID reader, etc., since its digital signal processing module has been determined, therefore this method cannot be applied.

In the field of wireless communication, Channel State Information (CSI) is a channel attribute of a communication link, which describes attenuation factors of a signal on each transmission path, that is, the value of each element in a channel gain matrix could reveal signal scatter, multi-path delay, Doppler frequency shift, a rank of a MIMO channel, a beam-forming vector, environmental attenuation, distance attenuation, and the like. The CSI enables a communication system to adapt to the current channel conditions and provides a guarantee for high reliability and high rate communication in a multi-antenna system.

In 2015, a Chinese Wei Wang in P.R.C. established a CSI-Speed model in a literature 3 (Understanding and Modeling of Wi-Fi Signal Based Human Activity Recognition, MobiCom15, the entire contents of which is hereby incorporated by reference in its entirety for all purposes), proposing that: the speed characteristics of a signal reflected by a moving object can be obtained from an amplitude of the Chanel State Information (CSI) of a Wi-Fi signal, and then it is applied to behavior identification.

In 2016, a Chinese Kun Qian gave a practical explanation on the CSI-Speed model in a literature 4 (Decimeter Level Passive Tracking with Wi-Fi, Hot Wireless 16, the entire contents of which is hereby incorporated by reference in its entirety for all purposes): a variation frequency of CSI amplitude reflects the Doppler frequency shift of the signal reflected by the moving object. However, the Doppler frequency shift information estimated in this way includes only a magnitude of the frequency shift, and does not include a direction of the frequency shift (forward/reverse shift), thus the complete Doppler frequency shift information cannot be obtained.

SUMMARY OF THE PRESENT DISCLOSURE

A wireless transmitting-receiving system may provide channel information to describe a change of a magnitude and a phase of a signal when the signal is transmitted through a wireless channel—attenuation and phase shift induced by the wireless channel. For example, on a commercial Wi-Fi device, the channel information generally appears as the Channel State Information (CSI), which reflects the amplitude attenuation and phase shift of the wireless signal transmitted from a transmitting terminal to a receiving terminal through the wireless channel.

In order to obtain complete Doppler frequency shift information of the wireless signal on a common commercial wireless signal transmitting-receiving system, the present disclosure provides a method for determining a Doppler frequency shift of a wireless signal directly reflected by a moving object, by using the phase information of the channel state information (CSI) on multiple antennas of a commercial Wi-Fi receiving terminal. In examples of the present disclosure, only one moving object is in the sensing environment—a target object. In examples of the present disclosure, a wireless signal directly reflected by the moving object refers to a wireless signal which is emitted from a transmitting terminal, then only reflected by the moving object, and finally directly arrives at a receiving terminal.

The principle of the present disclosure is: a path length of the wireless signal reflected by the moving object varies with the motion of the object, which results in time delay variation represented on the phase of the CSI. Therein, a rate of the CSI phase variation represents the magnitude of the Doppler frequency shift, and a direction of the phase variation (increased or decreased) represents a direction of the Doppler frequency shift. The present disclosure uses CSI collected at a plurality of times as samplings, uses the CSI of different subcarriers obtained at each sampling time as snapshots, and uses a MUSIC algorithm to determine the Doppler frequency shifts of the wireless signals on each path from the CSI phase variation, and therefore obtain a frequency spectrum. The present disclosure utilizes conjugate multiplication of the CSI of two antennas on the same wireless signal receiver to eliminate a random phase difference between the transmitting device and the receiving device. Since the Doppler frequency shifts of all static path signals (including a direct path signal and a signal reflected by a static object) are zero, within a time window of each frequency estimation, the present disclosure eliminates static path signals by subtracting a mean of the CSI, accordingly eliminates the effect on the Doppler frequency shift estimation caused by frequency information of the static path, so that the entire frequency shift information determined thereby is the Doppler frequency shift information of wireless signals reflected by the moving object (what are called dynamic path signals in the present disclosure). The wireless signal directly reflected by the moving object has the strongest energy in all the dynamic paths, thus a frequency value of highest peak in the frequency spectrum corresponds to the Doppler frequency shift of the wireless signal directly reflected by the moving object.

According to one aspect of the present disclosure, the present disclosure provides an example technical solution, which is:

a method for determining a Doppler frequency shift of a wireless signal directly reflected by a moving object, without modifying hardware devices, the method including conjugate multiplying the CSI measured on two antennas of a receiving device to eliminate a random phase shift cause by non-synchronization between a transmitting device and the receiving device, for CSI within a time window of one estimation, eliminating static path signals by subtracting the mean, using the CSI of different subcarriers included within each CSI as a plurality of snapshots of one CSI, to constitutes a CSI matrix, and using a MUSIC algorithm to calculate a frequency spectrum, selecting a frequency value of a highest spectral peak as the Doppler frequency shift of the wireless signal directly reflected by the moving object. The method may further include one or more of the following steps:

Constructing a pair of wireless transmitting-receiving devices, wherein the receiving device comprises two or more antennas that can receive wireless signals simultaneously;

a transmitting terminal being a wireless signal transmitting device (e.g., a Wi-Fi device, a RFID tag); a receiving terminal being a wireless signal receiving device.

The receiving terminal representing channel information collected on two antennas as channel state information (CSI), and conjugate multiplying the CSI to obtain the CSI with the random phase shift eliminated:

on a carrier with frequency f at time t, an original CSI on an antenna 1 is $x_1(f,t)$ (that is, a first CSI; comprising sampled CSI components of each subcarrier of that CSI, e.g., K subcarriers in the first CSI, which are expressed as: $x_1(f_1,t) \ldots x(f_K,t)$), and an original CSI on an antenna 2 is $x_2(f,t)$ (that is, a second CSI; comprising sampled CSI components of each subcarrier of that CSI, e.g., K subcarriers in the second CSI, which are expressed as: $x_2(f_1,t) \ldots x_2(f_K,t)$). Taking a conjugate complex number of the original CSI of the antenna 2: $\bar{x}_2(f,t)$, and multiplying it with the original CSI on the antenna 1 to obtain the CSI with the random shift eliminated: $x_c(f, t) = x_1(f,t)\bar{x}_2(f,t)$.

For M CSI obtained within the time window of one estimation ($[x_c(f,t_1), \ldots, x_c(f,t_M)]$), the mean is $\bar{x}_c(f) = \Sigma_{i=1}^{M} x_c(f,t_i) \div M$, the mean may be subtracted from each CSI thus eliminating static path signals, to get: $x(f,t_i) = x_c(f,t_i) - \bar{x}_c(f)$, $i=1, 2, \ldots, M$. In an example, M may be an integer greater than zero. In addition to the above described way, to accomplish a goal of this step, a high pass filter may also be used to filter components with the Doppler frequency shift of zero (specific filtering parameters may be determined according to the requirements of practical applications, and the purpose of the filtering may be eliminating the components with the Doppler frequency shift of zero).

Using the CSI on each subcarrier in each sampling obtained above (e.g., in the third step) as a snapshot to constitute the CSI matrix, running a MUSIC algorithm to determine the frequency spectrum;

Assuming in an estimation window, M samplings being obtained at the receiving terminal, each sampling containing CSI on K subcarriers, these M CSI constituting a signal vector X(f):

(Formula 1)

$$X(f) = \begin{bmatrix} x(f_1, t_0) & \ldots & x(f_K, t_0) \\ x(f_1, t_0 + \Delta t_2) & \ldots & x(f_K, t_0 + \Delta t_2) \\ \vdots & \ddots & \vdots \\ x(f_1, t_0 + \Delta t_M) & \ldots & x(f_K, t_0 + \Delta t_M) \end{bmatrix}$$

$$= \begin{bmatrix} 1 & \ldots & 1 \\ e^{-j2\pi f \frac{v_1 \Delta t_2}{c}} & \ldots & e^{-j2\pi f \frac{v_L \Delta t_2}{c}} \\ \vdots & \ddots & \vdots \\ e^{-j2\pi f \frac{v_1 \Delta t_M}{c}} & \ldots & e^{-j2\pi f \frac{v_L \Delta t_M}{c}} \end{bmatrix} \begin{bmatrix} s_1(f_1) & \ldots & s_1(f_K) \\ \vdots & \ddots & \vdots \\ s_L(f_1) & \ldots & s_L(f_K) \end{bmatrix} +$$

$$N(f)$$

$$= AS(f) + N(f)$$

In formula 1, $x(f_k, t_0+\Delta t_m)$ is a snapshot of the $m^{th}$ CSI on the $k^{th}$ subcarrier; $\Delta t_m$ is the time interval between the $m^{th}$ CSI and the first CSI, which may be determined according to a timestamp of the collected CSI; L is the number of paths requiring frequency estimation in space; $v_1$ is a speed of variation in length of the $l^{th}$ path, its corresponding Doppler frequency shift is $$f\frac{v_l}{c},$$

f is a central frequency of the used signal; $s_l(f_k)$ is the channel information on the $k^{th}$ subcarrier at the time $t_0$ of the $l^{th}$ path; N(f) is a noise matrix, $$A = \begin{bmatrix} 1 & \cdots & 1 \\ e^{-j2\pi f \frac{v_1 \Delta t_2}{c}} & \cdots & e^{-j2\pi f \frac{v_L \Delta t_2}{c}} \\ \vdots & \ddots & \vdots \\ e^{-j2\pi f \frac{v_1 \Delta t_M}{c}} & \cdots & e^{-j2\pi f \frac{v_L \Delta t_M}{c}} \end{bmatrix},$$

each column vector thereof is called a steering vector;

$$S(f) = \begin{bmatrix} s_1(f_1) & \cdots & s_1(f_K) \\ \vdots & \ddots & \vdots \\ s_L(f_1) & \cdots & s_L(f_K) \end{bmatrix}.$$

As described above, using the Multiple Signal Classification (MUSIC) algorithm, taking the CSI matrix (X(f)) in formula 1 as an input, according to formula 1, the frequency spectrum may be obtained (the frequency spectrum expressed in a manner that the frequency is in the abscissa, the signal intensity is in the ordinate), and from the spectrum, the probability of the existence of each Doppler frequency shift $$\left(f_{d,l} = f\frac{v_l}{c}\right)$$

may be obtained; wherein each spectral peak in the frequency spectrum corresponds to a recognized path, and the frequency value of each spectral peak corresponds to the Doppler frequency shift $f_{d,l}$ of the signal in the path. Since the original frequency of the signal (the center frequency f of the channel signal) and the propagation speed (speed of light, c) are known, the speed of variation in the length of each path, that is, a Doppler speed ($v_l$), may be obtained based on the Doppler frequency shift of each path derived from the obtained frequency spectrum.

In the practical operation, the FFT fast Fourier transform may also be used to obtain the frequency spectrum from the CSI of some subcarrier ($[x(f_1,t_0), x(f_1,t_0+\Delta t_2), \ldots, x(f_1,t_0+\Delta t_M)]$).

Obtaining Doppler frequency shift information of the wireless signal directly reflected by the moving object may include: selecting the frequency value of the highest spectral peak in the frequency spectrum as the Doppler frequency shift information of the wireless signal directly reflected by the moving object.

According to one embodiment of the present disclosure, a method for determining a Doppler frequency shift of a wireless signal directly reflected by a moving object includes, a wireless signal receiving terminal simultaneously receiving, from at least two antennas thereof respectively, the wireless signal transmitted from a same transmitting terminal; the receiving terminal collecting channel state information (CSI), on each of at least two antennas at a plurality of times, and conjugate multiplying the CSI respectively collected on two antennas of at least two antennas at the same time, to eliminate a random phase shift of signals between the receiving terminal and the transmitting terminal; determining the Doppler frequency shift of the wireless signal directly reflected by the moving object according to the CSI with the random phase shift eliminated.

According to another embodiment of the present disclosure, a method for determining a Doppler frequency shift of a wireless signal directly reflected by a moving object includes, a wireless signal receiving terminal simultaneously receiving from, at least two antennas thereof respectively, the wireless signal transmitted from a same transmitting terminal; the receiving terminal collecting channel state information (CSI), on each of at least two antennas at a plurality of times, and conjugate multiplying the CSI respectively collected on two antennas of at least two antennas at the same time, to eliminate a random phase shift of signals between the receiving terminal and the transmitting terminal; processing the CSI with the random phase shift eliminated by a high pass filter, to filter the components of Doppler frequency shift of zero; taking CSI of each subcarrier included in the filtered CSI as snapshots of the CSI to constitute a CSI matrix and determining the frequency spectrum by using the Multiple Signal Classification, i.e., the MUSIC algorithm and determining the Doppler frequency shift of the wireless signal directly reflected by the moving object according to the frequency spectrum.

According to another embodiment of the present disclosure, a method for determining a Doppler frequency shift of a wireless signal directly reflected by a moving object includes, a wireless signal receiving terminal simultaneously receiving from, at least two antennas thereof respectively, the wireless signal transmitted from a same transmitting terminal; the receiving terminal collecting channel state information (CSI), on each of at least two antennas at a plurality of times, and conjugate multiplying the CSI respectively collected on two antennas of at least two antennas at the same time, to eliminate a random phase shift of signals between the receiving terminal and the transmitting terminal; processing the CSI with the random phase shift eliminated to eliminate static path signals, including subtracting the mean calculated by all CSI with the random phase shift eliminated from each of the CSI with the random phase shift eliminated; performing a Fast Fourier transform (FFT) on CSI on one of each subcarrier of the processed CSI with the static path signals eliminated, therefore determining the Doppler frequency shift of the wireless signal directly reflected by the moving object.

According to one aspect of the present disclosure, a system for determining a Doppler frequency shift of a wireless signal directly reflected by a moving object is provided. The system includes, a receiving device with at least two antennas, configured to simultaneously receive the wireless signal transmitted from a same transmitting device on at least two antennas, and obtain channel state information, i.e., CSI; a memory, with stored instructions; a processor, configured to execute instructions to receive the CSI from the receiving device, and perform the following operations according to the CSI: conjugate multiplying the CSI simultaneously received from two antennas of at least two antennas respectively to eliminate a random phase shift of signals between the receiving device and the transmitting device, determining the Doppler frequency shift of the wireless signal directly reflected by the moving object according to the CSI with the random phase shift eliminated.

In one embodiment, a system for determining a Doppler frequency shift of a wireless signal directly reflected by a moving object, further performs the following operations: processing the conjugate multiplied CSI, so that each of which is subtracted by the mean calculated by all the conjugate multiplied CSI, to eliminate static path signals; determining the Doppler frequency shift of the wireless signal directly reflected by the moving object according to the processed CSI in which the static path signals are eliminated.

In another embodiment, a system for determining a Doppler frequency shift of a wireless signal directly reflected by a moving object further performs the following operations: taking CSI of each subcarrier included in the processed CSI with static path signal eliminated as snapshots of the CSI, constituting the CSI matrix and determining the frequency spectrum by the Multiple Signal Classification, i.e., MUSIC algorithm, and determining the Doppler frequency shift of the wireless signal directly reflected by the moving object according to the frequency spectrum.

In a further embodiment, a system for determining Doppler frequency shift of wireless signal directly reflected by moving object further performs the operation of selecting the frequency value of highest spectral peak in the frequency spectrum as the Doppler frequency shift of the wireless signal directly reflected by the moving object.

In an embodiment, the receiving device in the system for determining the Doppler frequency shift of the wireless signal directly reflected by the moving object includes a Wi-Fi signal receiving device or a RFID reader.

According to another aspect of the present disclosure, providing a computer readable storage medium which stores instructions configured to be executed by a processor, said instructions causing the computer to perform the operations of the above method for determining the Doppler frequency shift of the wireless signal directly reflected by the moving object.

Compared with other systems and methods, the advantage of the present disclosure is: providing a method for determining a Doppler frequency shift of a wireless signal directly reflected by a moving object. The present disclosure makes use of the conjugate multiplication of the channel state information, i.e., CSI, on two antennas to eliminate the random phase shift caused by non-synchronization of transmitting-receiving devices, and enables to obtain the entire Doppler frequency shift information—including the magnitude and the direction, from the phase information of channel state information. The present disclosure eliminates static path signals by removing the mean, eliminates the effect on the Doppler frequency shift estimation caused by the frequency information of static paths, thus more accurately determines the frequency. The present application utilizes the Multiple Signal Classification (MUSIC) algorithm to estimate the frequency spectrum according to the practical sampling interval, avoiding the effect on the accuracy of the determined frequency due to uneven sampling in the practical wireless transmitting-receiving system.

The method provided in the present disclosure has a low demand on the devices, therefore may be implemented on some common commercial wireless signal transmitting-receiving system. The method may be realized as long as the receiving device has two or more antennas, without needing to modify the hardware. Therefore, the technical solution provided by the present disclosure can be applied to common commercial wireless devices (such as a Wi-Fi network card, a Wi-Fi router, etc.); the technical solution provided by the present disclosure is fast, convenient in implementation, has a low cost, and has a high benefit.

DETAILED DESCRIPTION

The present disclosure will now be further described, through the embodiments, with reference to the drawings, but in no way limiting the scope of the present disclosure.

The present disclosure provides a method for determining a Doppler frequency shift of a wireless signal directly reflected by a moving object, based on a wireless signal multi-antenna transmitting-receiving system and a processing server (a processing system), eliminating a random phase shift caused by the non-synchronization of transmitting-receiving devices through conjugate multiplying the channel state information (CSI) on multi-antennas, after eliminating static path signals by subtracting a mean, taking the CSI of different subcarriers as snapshots, obtaining the frequency spectrum by using the Multiple Signal Classification(MUSIC) algorithm, and further obtaining the Doppler frequency shift of the signal directly reflected by a target object.

Figure 1:
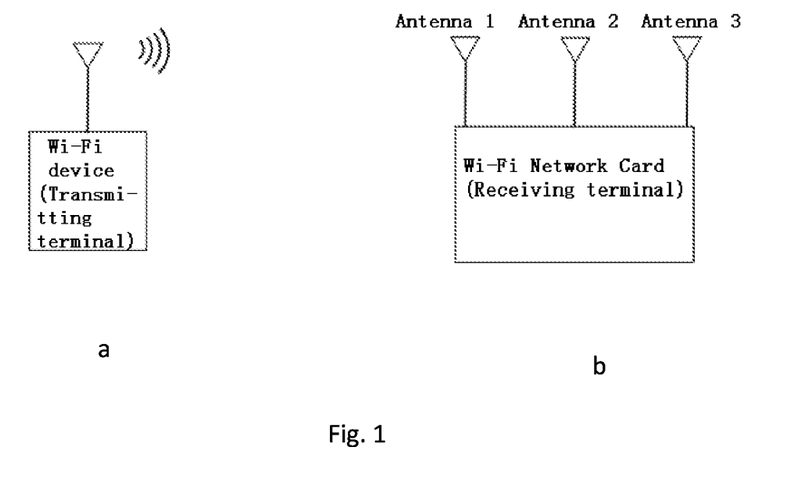
FIG. 1 is a Wi-Fi signal transmitting-receiving system built according to one embodiment of the present disclosure; wherein, a is the transmitting terminal (a Wi-Fi device); b is the receiving terminal (a Wi-Fi network card supporting 3 antenna ports which connect to 3 antennas respectively).

In one embodiment of the present disclosure, a wireless signal transmitting device can be a Wi-Fi device; a wireless signal receiving device can be a Wi-Fi device; and the wireless signal can be 2.4 GHZ or 5 GHz signal. A common commercial Wi-Fi network card supports connecting to 3 antennas (shown in FIG. 1). The present disclosure acquires CSI on 2 antennas. In the present embodiment, CSI measured on Antenna 1 and Antenna 2 of the receiving terminal may be used as illustrated in FIG. 1.

A method for determining a Doppler frequency shift of a wireless signal directly reflected by a moving object, includes following steps:

1) building an antenna array transmitting-receiving system of wireless signals, e.g., a commercial Wi-Fi transmitting-receiving system, including a transmitting terminal and a receiving terminal; the receiving terminal having a plurality of antennas capable of simultaneously receiving the wireless signal, e.g., a 5 GHz Wi-Fi signal;

2) the receiving terminal collecting channel state information (CSI) on different antennas;

3) conjugate multiplying the CSI on antenna 1 and antenna 2 to obtain the CSI with the random phase shift eliminated;

4) when 60 CSI being collected (a specific sampling number and a sampling frequency being decided by practical applications, in an embodiment of the present disclosure, at a sampling rate of 200 Hz, performing a frequency estimate for every 60 CSI), subtracting a mean of said 60 CSI from each CSI, to eliminate static path signals;

In some embodiments, the random phase shift can be eliminated for each CSI by conjugate multiplying as described in step 3) while CSI, the random phase shift also can be eliminated by conjugate multiplying each CSI after a sufficient number of 60 CSI being collected; but the operation described in step 4) that eliminates static path signals by subtracting the mean is performed after the sufficient number of 60 CSI being collected.

5) taking the CSI of each subcarrier included in each CSI as a snapshot of said CSI (in the embodiment of the present disclosure, each CSI including the CSI of 30 subcarriers), to constitute a CSI matrix, and then calculating the frequency spectrum using the MUSIC;

6) selecting the frequency to which the highest spectral peak corresponds as the Doppler frequency shift for the wireless signal directly reflected by the moving target.

In other embodiments, other wireless devices may also be selected, such as selecting a RFID tag as a wireless signal transmitting device (an active RFID tag or a passive RFID tag); the wireless signal receiving device is a RFID reader; the wireless signal is that used by the RFID device.

In another embodiment of the present disclosure, a common Wi-Fi device is used as a signal transmitting terminal, and a common commercial Wi-Fi network card (such as an INTEL 5300 network adapter/network card, ATHEROS AR9580 network adapter, ATHEROS AR9590 network adapter, etc.) is installed on a personal computer as a signal receiving terminal. There is a person moving freely in the transmission environment, the method provided by the present disclosure is used for recognizing a Doppler frequency shift of a signal directly reflected by said moving person, including the following steps:

1) Building a system:

build a multi-antenna Wi-Fi receiver using a commercial Wi-Fi network card, FIG. 1 shows a schematic of a receiver supporting 3-antennas. In the embodiment of the present disclosure, an Intel 5300 network card may be adopted to build the system using 5 GHz Wi-Fi signals and 20 MHz bandwidth. This embodiment includes a transmitting terminal, a receiving terminal, and a server (e.g., a processing system).

Figure 2:
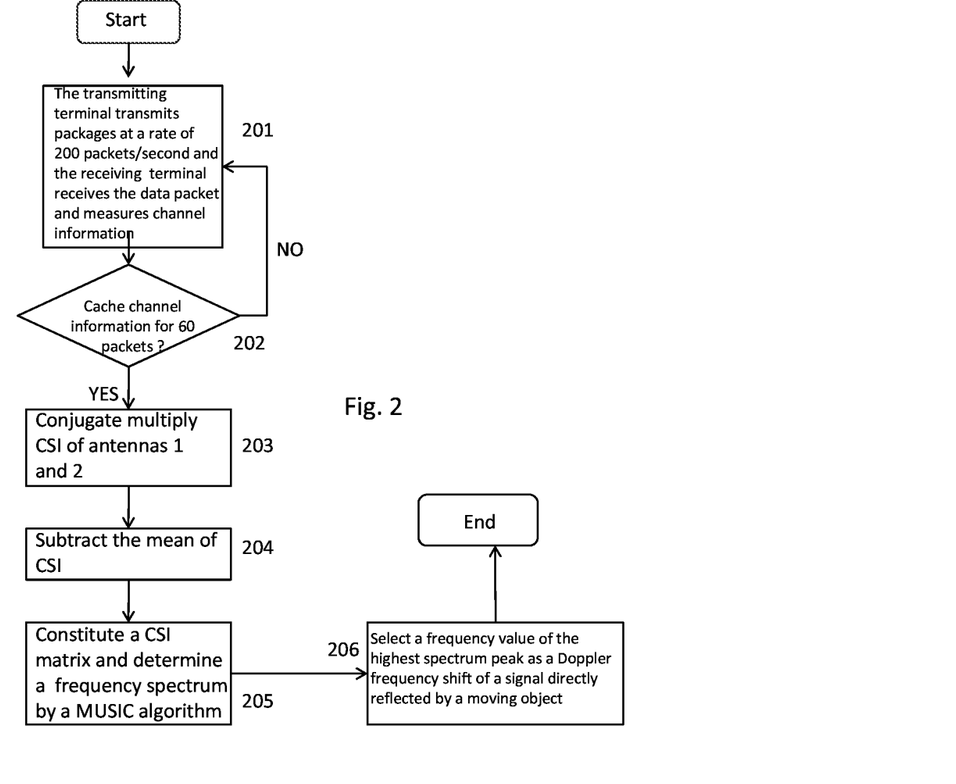
FIG. 2 is a flow block of a method for determining a Doppler frequency shift of a wireless signal directly reflected by a moving person according to one embodiment of the present disclosure.

The flow of an example process for determining the Doppler frequency shift of the signal directly reflected by the moving object by using the wireless signal receiver is shown in FIG. 2, including the following steps:

2) In step 201, the transmitting terminal may use one transmitting antenna to transmit a signal at a rate of 200 packets per second (each packet corresponding to a channel information sampling, i.e., 200 samplings per second, corresponding to a sampling rate of 200 Hz; the specific sampling rate being selected according to a frequency range to be perceived in practice), multiple antennas at the receiving terminal receiving the signal simultaneously, and collecting the channel information, and sending it to the server.

On the Wi-Fi network card, channel information is expressed by channel state information (CSI). In the present embodiment, an Intel 5300 network card is adopted with 5 GHz Wi-Fi signals and a 20 MHz bandwidth. The transmitting terminal transmits signals through one antenna and the receiving terminal uses three antennas to receive signals, thus a total of 3 pairs of transmitting-receiving antennas are built; each time the receiving terminal receiving a Wi-Fi signal package (i.e., every CSI), the Intel 5300 network card at the receiving end will obtain 90 CSI (that is, each antenna pair of 3 pairs of transmitting-receiving antennas will obtain 30 CSI corresponding to 30 subcarriers from 30 subcarriers of each sampling, and thus the total is 90 CSI).

3) In step 202, the method may include verifying whether the receiving terminal caches channel information of 60 CSI, if not, then continuing to cache the channel information, and if yes, proceeding to the next step 203;

In step 202 in FIG. 2, after verifying that the receiving terminal caches the channel information of 60 CSI, the CSI conjugate multiplication in step 203 is performed. In some embodiments, the amount of verified CSI can be decided according to practical needs.

4) In step 203, for a Wi-Fi packet received at time t, selecting the CSI collected on a first antenna and a second antenna (e.g., antenna 1 and antenna 2 of FIG. 1) for conjugate multiplication to eliminate the random phase shift caused by the non-synchronization at the transmitting terminal and the receiving terminal.

In some embodiments, step 203 may be performed on each CSI after step 202 being completed; step 203 may also be performed when one CSI is collected; such difference in sequence does not affect the result in practice.

5) In step 204, when 60 CSI being collected (the specific sampling amount and the sampling frequency are decided by practical applications, in the embodiment of the present disclosure, at a sampling rate of 200 Hz, a frequency estimate may be performed every 60 CSI), subtracting a mean of these 60 CSI from each CSI to eliminate the static path signals;

For a Wi-Fi network card, providing one CSI, caching the sufficient number of packets (the present embodiment uses 60, the selected number may be decided by the sampling frequency and application requirements in some examples) and eliminating static path signals.

6) In step 205, taking the CSI of each subcarrier included in each CSI as a snapshot of the CSI, constituting a CSI matrix and then calculating the frequency spectrum using the MUSIC algorithm.

For the Intel 5300 Wi-Fi network card used in present embodiment, each CSI includes channel information of 30 subcarriers, so each CSI includes 30 snapshots, and 60 CSI eventually constitute a 60×30 CSI matrix as an input to the MUSIC algorithm.

7) In step 206, selecting the frequency value of the highest peak corresponds in the frequency spectrum as the Doppler frequency shift of the signal directly reflected by the moving object.

Figure 3:
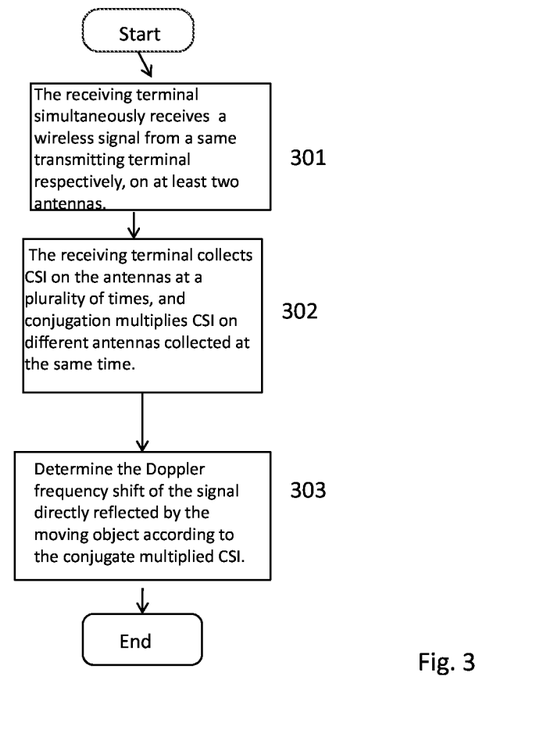
FIG. 3 is a flow diagram of an example method for determining a Doppler frequency shift of a wireless signal directly reflected by a moving object according to one embodiment of the present disclosure.

FIG. 3 is a flow block diagram of a method for determining a Doppler frequency shift of a wireless signal directly reflected by a moving object according to an embodiment of the present disclosure. In step 301, a wireless signal receiving terminal simultaneously receives, from at least two antennas thereof respectively, a wireless signal transmitted from a same transmitting terminal; in step 302, the receiving terminal collects the channel state information of the wireless signal, i.e., CSI, on antennas at a plurality of times, conjugate multiplies the CSI collected at the same time on different antennas; in step 303, the Doppler frequency shift of the wireless signal directly reflected by the moving object is determined according to the conjugate multiplied CSI.

In practical applications, there are alternative methods that can also realize determining the Doppler frequency shift of the wireless signal directly reflected by the moving object. The present disclosure further provides the following embodiments.

Figure 4:
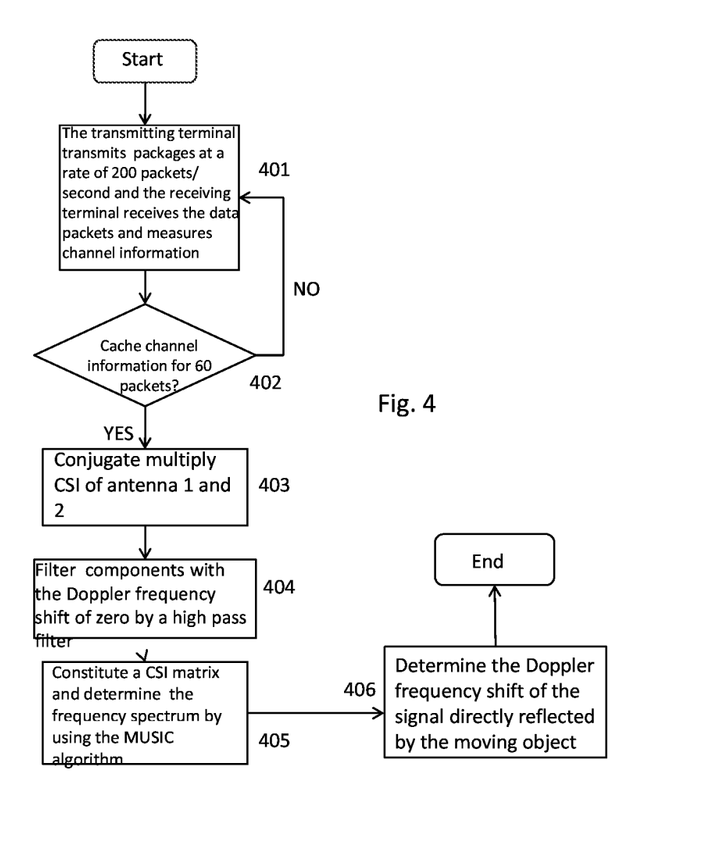
FIG. 4 is a flow diagram of an example method for determining a Doppler frequency shift of a wireless signal directly reflected by a moving object according to another embodiment of the present disclosure.

FIG. 4 is a flow block diagram of a method for determining a Doppler frequency shift of a wireless signal directly reflected by a moving object according to another embodiment of the present disclosure. The system used in FIG. 4 is the same as the system built in the embodiment shown in FIG. 2, and step 401, step 402, step 403, and step 405 correspond to step 201, step 202, step 203, and step 205 in FIG. 2, respectively. The above steps of FIG. 4 respectively perform the same operations as the corresponding steps in FIG. 2, and the details will not be described here for brevity. The method in this embodiment is proceeding from start to step 404, in step 404, filtering components with the Doppler frequency shift of zero in the conjugate multiplied CSI in step 403 by a high pass filter (specific filter parameters may be determined by the practical application requirements, and the purpose of the filtering may be eliminating the components with the Doppler frequency shift of zero); then the method proceeds to step 405, taking CSI of each subcarrier included in each CSI in which the components with Doppler frequency shift of zero are filtered out as the snapshot of said CSI, to constitute a CSI matrix, and then calculating the frequency spectrum using the MUSIC; thereafter, the process proceeds to step 406, determining the Doppler frequency shift of the wireless signal directly reflected by the moving object by using the calculated frequency spectrum. In some embodiments, the amount of channel information packets verified in step 402 can be decided according to practical needs. In some embodiments, step 403 may be performed on each CSI after step 402 is completed; or once one CSI is collected, step 403 is performed on the CSI; the difference in sequence does not affect the result in practice.

Figure 5:
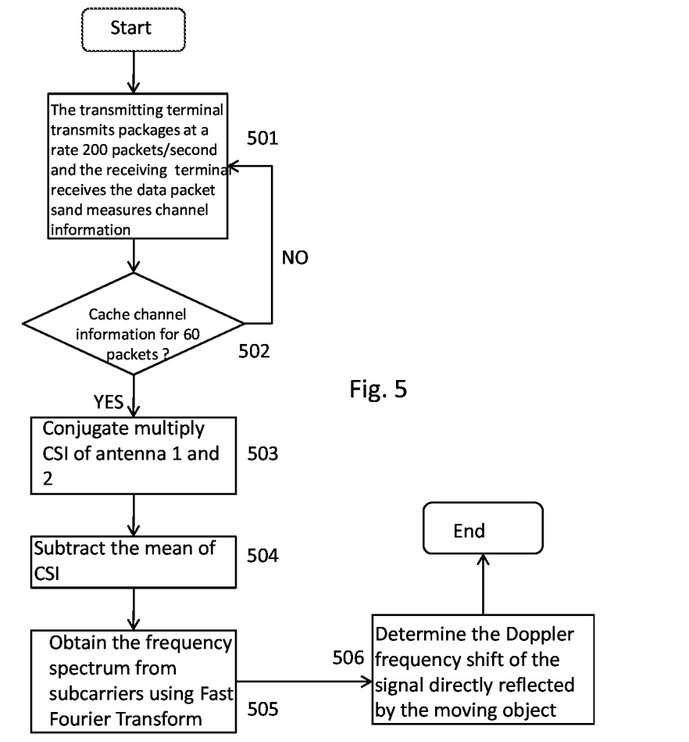
FIG. 5 is a flow diagram of an example method for determining a Doppler frequency shift of a wireless signal directly reflected by a moving object according to another embodiment of the present disclosure.

FIG. 5 is a flow blog diagram of a method for determining a Doppler frequency shift of a wireless signal directly reflected by a moving object according to a further embodiment of the present disclosure. The system used in FIG. 5 is the same as the system built in the embodiment shown in FIG. 2, and step 501, step 502, step 503, and step 504 correspond to step 201, step 202, step 203, step 204 in FIG. 2, respectively. The above steps of FIG. 5 respectively perform the same operations as the corresponding steps in FIG. 2, and will not be described in detail here for brevity. The method in this embodiment is proceeding from start to step 505, in step 505, for the CSI of the subcarriers of the CSI being subtracted the mean thereof to eliminate the static path signals in step 504 (e.g., $x(f_1,t_0)$, $x(f_1,t_0+\Delta t_2)$, . . . , $x(f_1,t_0+\Delta t_M)$, in which $f_1$ represents the first subcarrier, $t_0$ represents the time when the first CSI is sampled, $\Delta t_M$ is a time interval between the $M^{th}$ CSI and the first CSI), obtaining the frequency spectrum by using a Fast Fourier Transform (FFT); afterwards, the method proceeds to step 506, determining the Doppler frequency shift of the wireless signal directly reflected by the moving object according to the calculated frequency spectrum. In some embodiments, the amount of channel information packets verified in step 502 may be decided according to practical needs. In some embodiments, step 503 may be performed on each CSI after step 502 is completed; or once one CSI is collected, steps 503 is performed on CSI; the difference in sequence does not affect the result in practice.

Figure 6:
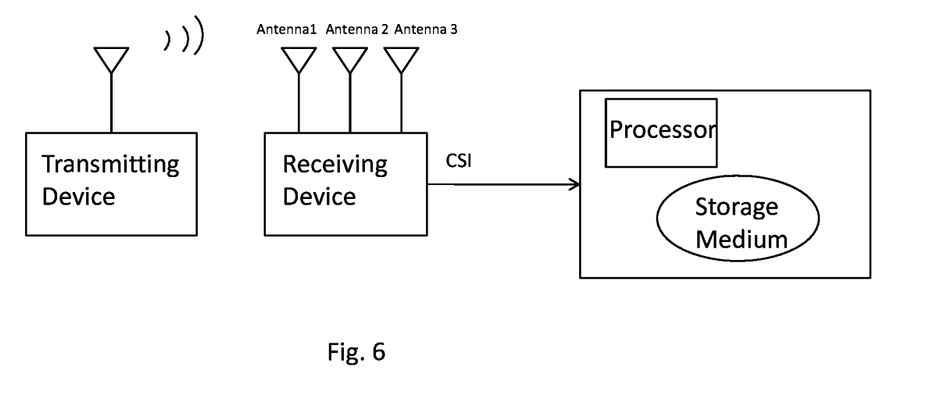
FIG. 6 is a system of operating an example method for determining a Doppler frequency shift of a wireless signal directly reflected by a moving object according to one embodiment of the present disclosure.

FIG. 6 is a system that operates a method for determining a Doppler frequency shift of a wireless signal directly reflected by a moving object according to one embodiment of the present disclosure. In FIG. 6, a wireless signal receiving device has three antennas, from each of which the receiving device simultaneously receives the wireless signal transmitted from a corresponding wireless signal transmitting device, collects channel state information (CSI) of the received wireless signal, and then sends the CSI signal to a processor; the processor performs corresponding processing on the CSI by using computer-executable program instructions stored in a computer-readable storage medium, so as to obtain the Doppler frequency shift of the wireless signal directly reflect by the moving object. Specifically, the system includes a receiving device with at least two antennas (for example, as shown in FIG. 6, there are three antennas, respectively antenna 1, antenna 2, and antenna 3), which is configured to simultaneously receive the wireless signal from a same transmitting device on the antennas, and obtain CSI; a processor, configured to receive the CSI from the receiving device and to perform the following operations based on the CSI: conjugate multiplying the CSI simultaneously received on two antennas of at least two antennas, so as to eliminate a random phase shift of the signals between the receiving device and the transmitting device, to determine the Doppler frequency shift of the wireless signal directly reflected by the moving object according to the CSI with the random phase shift eliminated. In another embodiment, the system may also perform the following operations: processing the conjugate multiplied CSI such that each of which subtracts the mean calculated by all conjugate multiplied CSI, to eliminate static path signals; determining the Doppler frequency shift of the wireless signal directly reflected by the moving object based on the processed CSI with static path signals eliminated. In another embodiment, the system may also perform operations of: taking the CSI of each subcarrier included in the processed CSI with static path signals eliminated as a snapshot of the CSI, constituting a CSI matrix and using a Multiple Signal Classification, i.e., MUSIC algorithm, to determine the frequency spectrum, and determining the Doppler frequency shift of the wireless signal reflected directly by the moving object based on the frequency spectrum. In addition, in one embodiment, the system may also perform the following operations: selecting the frequency value of the highest peak in the frequency spectrum as the Doppler frequency shift of the wireless signal directly reflected by the moving object.

Those skilled in the art will understand that the various illustrative logical blocks, modules, and algorithm components described with reference to the examples disclosed herein may be implemented as electronic hardware, computer software, or a combination of both. In addition, embodiments can also be embodied on a non-transitory machine-readable medium such that the processor or computer performs or operates a particular function.

To clearly illustrate the interchangeability of hardware and software, various illustrative parts, blocks, modules, circuits, and processing components have been generally described above in terms of functions thereof. Whether these functions are implemented as hardware or software depends on the specific application and design constraints applied on the overall system. Skilled technicians may implement the described functions in various ways for each particular application, but such implementation decisions should not be interpreted as departing from the protection scope of disclosed apparatus and methods.

The parts of the method or algorithm described with reference to the examples disclosed herein may be embodied directly in hardware, a software module run by a processor, or a combination of both. The parts of the methods and algorithms can also be performed in a sequence alternating with the sequence provided in the examples. A software module may reside in a RAM memory, a flash memory, a ROM memory, an EPROM memory, an EEPROM memory, registers, a hard disk, a removable disk, an optical disk, or any other form of storage medium known in the art. An illustrative storage medium is coupled to the processor such that the processor can read information therefrom, and write information thereto. In an alternative way, the storage medium and the processor may be integrated together. The processor and the storage medium may reside in an Application Specific Integrated Circuit (ASIC).

Figure 7:
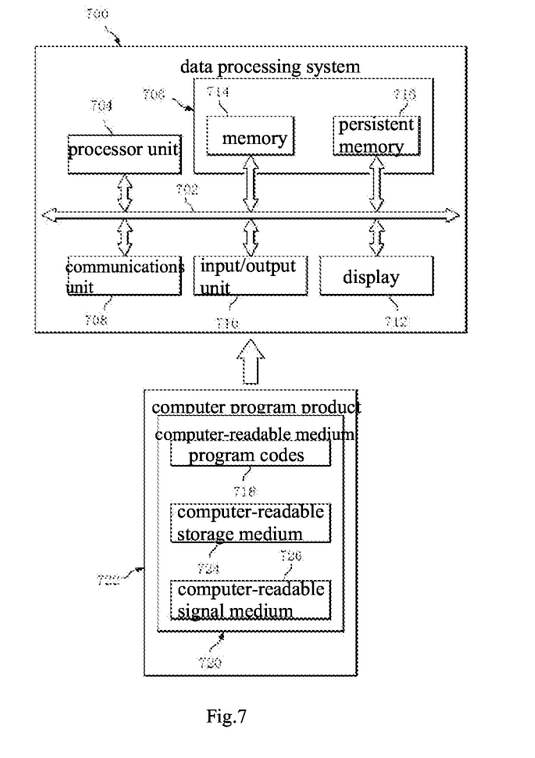
FIG. 7 is an example digital processing system described in a block diagram according to one embodiment of the present disclosure.

FIG. 7 shows a data processing system in a block diagram. A data processing system 700 may be used to implement various systems in the present disclosure.

As shown in FIG. 7, the data processing system 700 includes a communication architecture 702 that provides communications between a processor unit 704, a storage device 706, a communications unit 708, an input/output unit 710, and a display. In some cases, the communication architecture 702 may be implemented as a bus system.

The processor unit 704 is configured to execute instructions of software, so as to perform several operations. The processor unit 704 may include several processors, multi-core processors, and/or some other type of processor according to the implementation. In some cases, the processor unit 704 may be in a form of a hardware unit, such as a circuit system, an Application Specific Integrated Circuit (ASIC), a programmable logic device, or some other suitable type of hardware unit.

The instructions, applications, and/or programs of the operating system running on the processor unit 704 may be located in the storage device 706. The storage device 706 may communicate with the processor unit 704 through the communication architecture 702. As used herein, a storage device, also referred to as a computer-readable storage device, is any hardware that can temporarily and/or persistently store information. This information may include, but is not limited to, data, program code, and/or other information.

The memory 714 and the persistent memory 716 are examples of the storage devices 706. The memory 714 may be in forms of, for example, a Random Access Memory or some volatile or non-volatile memory device. The persistent memory 716 may include any amount of parts and apparatus. For example, the persistent memory 716 may include a hardware device, a flash memory, a rewritable optical disk, a rewritable magnetic tape, or other combinations of the above. The medium used by the persistent memory 716 may be or may not be removable.

The communication unit 708 allows the data processing system 700 to communicate with other data processing systems and/or devices. The communications unit 708 may provide communications by using physical and/or wireless communications links.

The input/output unit 710 allows receiving inputs and sending outputs from other devices connected to the data processing system 700. For example, the input/output unit 710 may allow a user to receive inputs from a keyboard, a mouse, and/or some other type of an input device. As another example, the input/output unit 710 may allow sending outputs to a printer connected to the data processing system 700.

The display 712 is configured to display information to users. The display 712 may include, for example, but is not limited to, a monitor, a touch panel, a laser display, a holographic display, a virtual display device, and/or some other type of a display device.

In this illustrative example, the process of different illustrative embodiments may be performed by the processor unit 704 using the computer to implement instructions. These instructions may be referred to as program codes, computer-usable program instructions, or computer-readable program codes, and one or more processors in the processor unit 704 may read and execute.

In these examples, program codes 718 are located in a functional form in the computer-readable medium 720 and may be loaded into or transferred to the data processing system 700 for execution by a processor unit; where the computer-readable medium 720 may be selectively removable. Program codes 718 and the computer-readable medium 720 together form a computer program product 722. In this illustrative example, the computer-readable medium 720 may be a computer-readable storage medium 724 or a computer-readable signal medium 726.

The computer-readable storage medium 724 is a physical or tangible storage device for storing program codes 718 rather than a medium for propagating or transferring program codes 718. The computer-readable storage device may be, for example, but is not limited to, an optical disk or a magnetic disk or a persistent storage device connected to a data processing system.

Alternatively, program codes 718 may be transferred to the data processing system 700 using a computer-readable signal medium. The computer-readable signal medium 726 may be, for example, a propagated data signal containing program codes 718. The data signal may be an electromagnetic signal, an optical signal, and/or some other signal that can be transmitted over physical and/or wireless communication links.

The data processing system 700 illustrated in FIG. 7 does not intend to provide limitations of architectural for implementing these illustrative embodiments. The data processing systems capable of implementing different embodiments from those in the illustrative embodiments may include additional parts or parts taking place of those illustrated in the data processing system 700. In addition, the parts shown in FIG. 7 may be different from those in the illustrated examples.

It should be noticed that the purpose of disclosed embodiments of present disclosure is to assist in further understanding the present disclosure, and to provide descriptions of above-disclosed examples so that those skilled in the art may manufacture or use the disclosed methods and devices. Various alterations and modifications of these examples are possible to those skilled in the art, and the principles defined herein may be applied to other examples without departing from the spirit or scope of the disclosed methods and devices. The embodiments described in all respects are to be considered as illustration but not limitation, and the protection scope of the disclosure is, therefore, indicated by the appended claims rather than by the foregoing description. All changes falling into the equivalent meaning and range of the Claims are to be incorporated within the scope of the Claims.

The invention claimed is:

1. A method for determining a state of a moving object, the method comprises:
   simultaneously receiving, with a wireless signal receiving terminal from at least two antennas thereof respectively, a wireless signal from a same transmitting terminal;
   collecting channel state information (CSI), with the receiving terminal on each of the at least two antennas at a plurality of times, and processing the CSI respectively collected at the same time on two antennas of the at least two antennas, to eliminate a random phase shift of the wireless signal between the receiving terminal and the transmitting terminal;
   determining a Doppler frequency shift of the wireless signal directly reflected by the moving object according to the CSI with the random phase shift eliminated.

2. The method according to claim 1, wherein the processing comprises conjugate multiplying the CSI respectively collected at the same time on two antennas of the at least two antennas.

3. The method according to claim 2, further comprising determining a speed of variation in length of a path of a signal reflected by the moving object according to the Doppler frequency shift of the wireless signal directly reflected by the moving object, so as to obtain a moving state of the moving object.

4. The method according to claim 2, wherein the conjugate multiplication comprises conjugate complex multiplication of a first CSI collected on one of the at least two antennas and a second CSI collected on an other antenna of the at least two antennas, wherein the first CSI and the second CSI are collected at the same time.

5. The method according to claim 2, further comprising:
   processing the CSI with the random phase shift eliminated to eliminate static path signals, and determining the Doppler frequency shift of the wireless signal directly reflected by the moving object according to the processed CSI with static path signals eliminated.

6. The method according to claim 5, wherein the static path signals comprise a direct path signal and a signal only reflected by static objects.

7. The method according to claim 5, further comprising:
   taking CSI of each subcarrier included in the processed CSI with static path signals eliminated as a snapshot of the CSI, so as to constitute a CSI matrix and determining a frequency spectrum by using a Multiple Signal Classification algorithm, i.e., MUSIC algorithm, and determining the Doppler frequency shift of the wireless signal directly reflected by the moving object according to the frequency spectrum.

8. The method according to claim 7, further comprising: selecting a frequency value of a highest spectral peak in the frequency spectrum as the Doppler frequency shift of the wireless signal directly reflected by the moving object.

9. The method according to claim 7, wherein constituting the CSI matrix and determining the frequency spectrum by using the MUSIC algorithm comprise constituting an antenna array signal vector X(f) by CSI collected at a plurality of times, and processing it as follows:

$$X(f) = \begin{bmatrix} x(f_1, t_0) & \cdots & x(f_K, t_0) \\ x(f_1, t_0+\Delta t_2) & \cdots & x(f_K, t_0+\Delta t_2) \\ \vdots & \ddots & \vdots \\ x(f_1, t_0+\Delta t_M) & \cdots & x(f_K, t_0+\Delta t_M) \end{bmatrix} =$$

$$\begin{bmatrix} 1 & \cdots & 1 \\ e^{-j2\pi f \frac{v_1 \Delta t_2}{c}} & \cdots & e^{-j2\pi f \frac{v_L \Delta t_2}{c}} \\ \vdots & \ddots & \vdots \\ e^{-j2\pi f \frac{v_1 \Delta t_M}{c}} & \cdots & e^{-j2\pi f \frac{v_L \Delta t_M}{c}} \end{bmatrix} \begin{bmatrix} s_1(f_1) & \cdots & s_1(f_K) \\ \vdots & \ddots & \vdots \\ s_L(f_1) & \cdots & s_L(f_K) \end{bmatrix} + N(f) =$$

$$AS(f) + N(f)$$

wherein, M is a number of CSI, K is a number of subcarriers included in each CSI, $\Delta t_m$ is a time interval between the $m^{th}$ CSI and a first CSI, which can be determined according to a timestamp of the collected CSI; L is a number of paths requiring frequency estimation in space; $v_l$ is a speed of variation in length of $l^{th}$ path corresponding to a Doppler frequency shift of $$f \frac{v l}{c},$$

f is a central frequency of a used signal; $s_l(f_k)$ is channel information on the $K^{th}$ subcarrier at the time $t_0$ when the $l^{th}$ path is firstly sampled; N(f) is a noise matrix, and each vector of A is called a steering vector,
   wherein, using the MUSIC algorithm, taking the antenna array signal vector X(f) as an input to calculate the frequency spectrum, so as to determine the Doppler frequency shift of the wireless signal directly reflected by the moving object.

10. The method according to claim 9, wherein, using the MUSIC algorithm, taking the antenna array signal vector X(f) as the input to calculate the frequency spectrum, so as to determine the Doppler frequency shift of the wireless signal directly reflected by the moving object comprises:
   constructing the frequency spectrum by taking the frequency as an abscissa, a signal intensity as an ordinate, wherein each spectral peak of the frequency spectrum corresponds to a recognized path, and a frequency value to which the spectral peak corresponds is the Doppler frequency shift $$f \frac{v l}{c}$$

of a signal in the path, determining the Doppler frequency shift of the wireless signal directly reflected by the moving object according to a central frequency and a light speed of the used signal.

11. The method according to claim 2, further comprising:
   subtracting a mean calculated by all CSI at a plurality of times with the random phase shift eliminated from each of the CSI collected with the random phase shift eliminated.

12. The method according to claim 2, wherein the receiving terminal is a Wi-Fi signal receiving terminal or a RFID reader.

13. A system for determining a Doppler frequency shift of a wireless signal directly reflected by a moving object, the system comprising:
   a receiving device with at least two antennas, configured to simultaneously receive from the at least two antennas respectively the wireless signal transmitted from a same transmitting device, and obtain the received wireless signal as a channel state information (CSI);
a memory storing instructions;
a processor, configured to execute the instructions to receive the CSI from the receiving device and perform the following operations according to the CSI:
conjugate multiplying the CSI respectively collected on two antennas of the at least two antennas at a same time, to eliminate a random phase shift of signals between the receiving device and the transmitting device, and determining the Doppler frequency shift of the wireless signal directly reflected by the moving object according to the CSI with the random phase shift eliminated.

14. The system according to claim 13, wherein the conjugate multiplying comprises conjugate complex multiplication of the CSI from one of the at least two antennas and the CSI from an other, different antenna of the at least two antennas.

15. The system according to claim 13, wherein the processor further performs the following operations:
processing the conjugate multiplied CSI, such that each of which subtracts a mean calculated by all conjugate multiplied CSI, to eliminate static path signals; and
determining the Doppler frequency shift of the wireless signal directly reflected by the moving object by the processed CSI with the static path signals eliminated.

16. The system according to claim 15, wherein the processor further performs the following operations:
taking CSI of each subcarrier included in the processed CSI with the static path signals eliminated as a snapshot of the CSI, constituting a CSI matrix and determining a frequency spectrum by using a MUSIC algorithm, and determining the Doppler frequency shift of the wireless signal directly reflected by the moving object according to the frequency spectrum.

17. The system according to claim 16, wherein the processor further performs an operation of selecting a frequency value to which a highest spectral peak corresponds as the Doppler frequency shift for the wireless signal directly reflected by the moving object.

18. The system according to claim 13, wherein the receiving device comprises a Wi-Fi signal receiving device or a RFID reader.

19. A computer-readable storage medium, storing instructions that are configured to be executed by a processor, the instructions causing a computer to perform a method for determining a state of a moving object, the method comprising:
simultaneously receiving, with a wireless signal receiving terminal from at least two antennas thereof respectively, a wireless signal from a same transmitting terminal;
collecting channel state information (CSI), with the receiving terminal, on each of the at least two antennas at a plurality of times, and processing the CSI respectively collected at the same time on two antennas of the at least two antennas, to eliminate a random phase shift of the wireless signal between the receiving terminal and the transmitting terminal;
determining a Doppler frequency shift of the wireless signal directly reflected by the moving object according to the CSI with the random phase shift eliminated.

20. The computer-readable storage medium according to claim 19, wherein the processing comprises conjugate multiplying the CSI respectively collected at the same time on two antennas of the at least two antennas.

* * * * *